United States Patent
Blankenship

(10) Patent No.: US 10,666,411 B2
(45) Date of Patent: *May 26, 2020

(54) COMMUNICATING A TRANSPORT BLOCK IN A WIRELESS NETWORK

(71) Applicant: Telefonaktiebolaget LM Ericsson (publ), Stockholm (SE)

(72) Inventor: Yufei Blankenship, Kildeer, IL (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/059,296

(22) Filed: Aug. 9, 2018

(65) Prior Publication Data
US 2018/0351722 A1    Dec. 6, 2018

Related U.S. Application Data

(63) Continuation of application No. 15/119,492, filed as application No. PCT/EP2016/060818 on May 13, 2016, now Pat. No. 10,079,662.

(Continued)

(51) Int. Cl.
*H04L 5/00* (2006.01)
*H04L 1/00* (2006.01)
(Continued)

(52) U.S. Cl.
CPC .......... *H04L 5/0053* (2013.01); *H04L 1/0031* (2013.01); *H04L 1/08* (2013.01); *H04W 72/042* (2013.01); *H04W 72/048* (2013.01)

(58) Field of Classification Search
None
See application file for complete search history.

(56) References Cited

U.S. PATENT DOCUMENTS

| | | | |
|---|---|---|---|
| 7,774,686 B2* | 8/2010 | Ahn | H04L 1/1812 714/776 |
| 8,560,909 B2* | 10/2013 | Ahn | H04L 1/1812 714/748 |

(Continued)

FOREIGN PATENT DOCUMENTS

| | | |
|---|---|---|
| JP | 2014531856 A | 11/2014 |
| JP | 2018514110 A | 5/2018 |

(Continued)

OTHER PUBLICATIONS

Ericsson, "Physical channel timing relationships for MTC", 3GPP TSG-RAN WG1 Meeting #80bis, Belgrade, Serbia, Apr. 20, 2015, pp. 1-4, R1-151206.

(Continued)

*Primary Examiner* — Bunjob Jaroenchonwanit
(74) *Attorney, Agent, or Firm* — Coats & Bennett, PLLC

(57) ABSTRACT

A communication device receives a repetition index, a set indicator, and a downlink transmission. The downlink transmission spans a plurality of subframes. The communication device uses the repetition index as an index into one of a plurality of sets of subframe values specified by the set indicator to determine the number of subframes spanned by the downlink transmission, and decodes the downlink transmission according to the determined number of subframes.

20 Claims, 14 Drawing Sheets

970

971 — Receiving control information comprising a Modulation and Coding Scheme, MCS, index. The MCS index indicates at least one of a Transport Block Size index and a number of subframes the downlink transmission used to carry the downlink transmission.

972 — Using the number of subframes to decode the transmission

Related U.S. Application Data

(60) Provisional application No. 62/162,236, filed on May 15, 2015.

(51) Int. Cl.
*H04L 1/08* (2006.01)
*H04W 72/04* (2009.01)

(56) References Cited

U.S. PATENT DOCUMENTS

| | | | |
|---|---|---|---|
| 9,031,008 B2* | 5/2015 | Nam | H04L 5/0048 370/252 |
| 9,161,348 B2 | 10/2015 | Papasakellariou et al. | |
| 9,515,780 B2* | 12/2016 | Shu | H04L 1/1861 |
| 10,079,662 B2* | 9/2018 | Blankenship | H04L 1/0031 |
| 10,111,224 B2 | 10/2018 | Lee et al. | |
| 2011/0044278 A1* | 2/2011 | Astely | H04L 1/1621 370/329 |
| 2011/0228731 A1* | 9/2011 | Luo | H01Q 3/2605 370/329 |
| 2012/0044871 A1* | 2/2012 | Li | H04L 1/1854 370/328 |
| 2012/0263107 A1 | 10/2012 | Taghavi Nasrabadi et al. | |
| 2014/0056237 A1* | 2/2014 | Eriksson | H04L 1/0006 370/329 |
| 2014/0073336 A1* | 3/2014 | Kang | H04W 72/082 455/452.1 |
| 2014/0153450 A1* | 6/2014 | Jang | H04B 7/2643 370/280 |
| 2014/0348115 A1* | 11/2014 | Wang | H04N 21/2365 370/329 |
| 2014/0362756 A1 | 12/2014 | Maeda et al. | |
| 2014/0369242 A1* | 12/2014 | Ng | H04W 72/0453 370/280 |
| 2015/0003272 A1 | 1/2015 | Hu et al. | |
| 2015/0085840 A1* | 3/2015 | Liu | H04W 72/0446 370/336 |
| 2015/0131579 A1 | 5/2015 | Li et al. | |
| 2016/0028532 A1* | 1/2016 | Yin | H04W 16/02 370/280 |
| 2016/0094314 A1* | 3/2016 | Wong | H04L 1/1657 370/236 |
| 2016/0277169 A1* | 9/2016 | Park | H04L 1/1854 |
| 2016/0295577 A1* | 10/2016 | Harrison | H04W 72/042 |
| 2016/0353440 A1* | 12/2016 | Lee | H04W 4/005 |
| 2016/0374084 A1* | 12/2016 | Zhang | H04L 1/1893 |
| 2017/0013643 A1* | 1/2017 | Nan | H04W 74/006 |
| 2017/0064689 A1* | 3/2017 | Nimbalker | H04L 5/001 |
| 2017/0078079 A1* | 3/2017 | Papasakellariou | H04W 72/04 |
| 2017/0181009 A1* | 6/2017 | Wong | H04W 16/26 |
| 2017/0238339 A1* | 8/2017 | Lee | H04W 74/002 370/280 |
| 2017/0265098 A1* | 9/2017 | Yuda | H04L 1/0026 |
| 2017/0265174 A1* | 9/2017 | Wang | H04W 72/042 |
| 2017/0289852 A1* | 10/2017 | Yang | H04L 5/001 |
| 2017/0295601 A1* | 10/2017 | Kim | H04W 76/023 |
| 2017/0303283 A1* | 10/2017 | Ng | H04W 72/0453 |
| 2017/0318576 A1* | 11/2017 | Yang | H04L 1/1854 |

FOREIGN PATENT DOCUMENTS

| | | |
|---|---|---|
| RU | 2527753 C2 | 9/2014 |
| WO | 2015018617 A1 | 2/2015 |
| WO | 2015062557 A1 | 5/2015 |
| WO | 2016161618 A1 | 10/2016 |

OTHER PUBLICATIONS

NTT DoCoMo, "Views on multiple repetition levels for PDSCH/PUSCH", 3GPP TSG RAN WG1 Meeting #80bis, Belgrade, Serbia, Apr. 20, 2015, pp. 1-4, R1-152052.

3rd Generation Partnership Project, "3rd Generation Partnership Project; Technical Specification Group Radio Access Network; Evolved Universal Terrestrial Radio Access (E-UTRA); Physical channels and modulation (Release 12)", Technical Specification, 3GPP TS 36.211 V12.0.0, Dec. 1, 2013, pp. 1-120, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.0.0, Dec. 1, 2013, pp. 1-186, 3GPP, France.

3rd Generation Partnership Project, "3rd Generation Partnership Project; Technical Specification Group Radio Access Network; Study on provision of low-cost Machine-Type Communications (MTC) User Equipments (UEs) based on LTE (Release 12)", Technical Report, 3GPP TR 36.888 V12.0.0, Jun. 1, 2013, pp. 1-55, 3GPP, France.

* cited by examiner

| TABLE 1 | | |
|---|---|---|
| MCS Index $I_{MCS}$ | Modulation Order $Q_m$ | TBS Index $I_{TBS}$ |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

FIGURE 7

| | TABLE 2 | | | | | |
|---|---|---|---|---|---|---|
| $I_{TBS}$ | $N_{PRB}$ | | | | | |
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | 1032 |
| 11 | 176 | 376 | 584 | 776 | 1000 | 1192 |
| 12 | 208 | 440 | 680 | 904 | 1128 | 1352 |
| 13 | 224 | 488 | 744 | 1000 | 1256 | 1544 |
| 14 | 256 | 552 | 840 | 1128 | 1416 | 1736 |
| 15 | 280 | 600 | 904 | 1224 | 1544 | 1800 |
| 16 | 328 | 632 | 968 | 1288 | 1608 | 1928 |
| 17 | 336 | 696 | 1064 | 1416 | 1800 | 2152 |
| 18 | 376 | 776 | 1160 | 1544 | 1992 | 2344 |
| 19 | 408 | 840 | 1288 | 1736 | 2152 | 2600 |
| 20 | 440 | 904 | 1384 | 1864 | 2344 | 2792 |
| 21 | 488 | 1000 | 1480 | 1992 | 2472 | 2984 |
| 22 | 520 | 1064 | 1608 | 2152 | 2664 | 3240 |
| 23 | 552 | 1128 | 1736 | 2280 | 2856 | 3496 |
| 24 | 584 | 1192 | 1800 | 2408 | 2984 | 3624 |
| 25 | 616 | 1256 | 1864 | 2536 | 3112 | 3752 |
| 26 | 712 | 1480 | 2216 | 2984 | 3752 | 4392 |

FIGURE 8

| TABLE 3 ||
|---|---|
| Repetition Index $I_{rep,pdsch}$ | Number of Repetitions across Subframe $N_{rep,pdsch}$ |
| 0 | $N_{rep,pdsch,0}$ |
| 1 | $N_{rep,pdsch,1}$ |
| 2 | $N_{rep,pdsch,2}$ |
| 3 | $N_{rep,pdsch,3}$ |

FIGURE 9

| | TABLE 4 | | | | | |
|---|---|---|---|---|---|---|
| $I_{TBS}$ | $N_{PRB}$ | | | | | |
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | 1032 |
| 11 | 176 | 376 | 584 | 776 | 1000 | 1192 |
| 12 | 208 | 440 | 680 | 904 | 1128 | 1352 |
| 13 | 224 | 488 | 744 | 1000 | 1256 | 1544 |
| 14 | 256 | 552 | 840 | 1128 | 1416 | 1736 |
| 15 | 280 | 600 | 904 | 1224 | 1544 | 1800 |
| 16 | 328 | 632 | 968 | 1288 | 1608 | 1928 |
| 17 | 336 | 696 | 1064 | 1416 | 1800 | 2152 |
| 18 | 376 | 776 | 1160 | 1544 | 1992 | 2344 |
| 19 | 408 | 840 | 1288 | 1736 | 2152 | 2600 |
| 20 | 440 | 904 | 1384 | 1864 | 2344 | 2792 |
| 21 | 488 | 1000 | 1480 | 1992 | 2472 | 2984 |
| 22 | 520 | 1064 | 1608 | 2152 | 2664 | 3240 |
| 23 | 552 | 1128 | 1736 | 2280 | 2856 | 3496 |
| 24 | 584 | 1192 | 1800 | 2408 | 2984 | 3624 |
| 25 | 616 | 1256 | 1864 | 2536 | 3112 | 3752 |
| 26 | 712 | 1480 | 2216 | 2984 | 3752 | 4392 |

FIGURE 10

| TABLE 5 | | |
|---|---|---|
| MCS Index $I_{MCS}$ | Modulation Order $Q_m$ | TBS Index for MTC $I_{TBS}$ |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |
| 16 | 4 | 16 |
| 17 | 6 | 17 |
| 18 | 6 | 18 |
| 19 | 6 | 19 |
| 20 | 6 | 20 |
| 21 | 6 | 21 |
| 22 | 6 | 22 |
| 23 | 6 | 23 |
| 24 | 6 | 24 |
| 25 | 6 | 25 |
| 26 | 6 | 26 |
| 27 | 2 | ITBS = 0, Nrep,pdsch = 2 |
| 28 | 2 | ITBS = 2, Nrep,pdsch = 2 |
| 29 | 2 | Nrep,pdsch = 2, reserved |
| 30 | 2 | Nrep,pdsch = 4, reserved |
| 31 | 2 | Nrep,pdsch = 6, reserved |

FIGURE 11

| TABLE 6 | | |
|---|---|---|
| MCS Index $I_{MCS}$ | Modulation Order $Q_m$ | TBS Index for MTC $I_{TBS}$ |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |
| 16 | 4 | 16 |
| 17 | 6 | 17 |
| 18 | 6 | 18 |
| 19 | 6 | 19 |
| 20 | 6 | 20 |
| 21 | 6 | 21 |
| 22 | 2 | $I_{TBS} = 0$, $N_{rep,pdsch} = 2$ |
| 23 | 2 | $I_{TBS} = 0$, $N_{rep,pdsch} = 4$ |
| 24 | 2 | $I_{TBS} = 0$, $N_{rep,pdsch} = 6$ |
| 25 | 2 | $I_{TBS} = 2$, $N_{rep,pdsch} = 2$ |
| 26 | 2 | $I_{TBS} = 2$, $N_{rep,pdsch} = 4$ |
| 27 | 2 | $I_{TBS} = 2$, $N_{rep,pdsch} = 6$ |
| 28 | 2 | $I_{TBS} = 4$, $N_{rep,pdsch} = 2$ |
| 29 | 2 | $N_{rep,pdsch} = 2$, reserved |
| 30 | 2 | $N_{rep,pdsch} = 4$, reserved |
| 31 | 2 | $N_{rep,pdsch} = 6$, reserved |

FIGURE 12

| TABLE 7 | | |
|---|---|---|
| MCS Index $I_{MCS}$ | Modulation Order $Q_m$ | TBS Index for MTC $I_{TBS}$ |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |
| 16 | 4 | 16 |
| 17 | 2 | $I_{TBS} = 0$, $N_{rep,pdsch} = 2$ |
| 18 | 2 | $I_{TBS} = 0$, $N_{rep,pdsch} = 4$ |
| 19 | 2 | $I_{TBS} = 0$, $N_{rep,pdsch} = 6$ |
| 20 | 2 | $I_{TBS} = 0$, $N_{rep,pdsch} = 8$ |
| 21 | 2 | $I_{TBS} = 2$, $N_{rep,pdsch} = 2$ |
| 22 | 2 | $I_{TBS} = 2$, $N_{rep,pdsch} = 4$ |
| 23 | 2 | $I_{TBS} = 2$, $N_{rep,pdsch} = 6$ |
| 24 | 2 | $I_{TBS} = 2$, $N_{rep,pdsch} = 8$ |
| 25 | 2 | $I_{TBS} = 4$, $N_{rep,pdsch} = 2$ |
| 26 | 2 | $I_{TBS} = 4$, $N_{rep,pdsch} = 4$ |
| 27 | 2 | $I_{TBS} = 4$, $N_{rep,pdsch} = 6$ |
| 28 | 2 | $I_{TBS} = 4$, $N_{rep,pdsch} = 8$ |
| 29 | 2 | $N_{rep,pdsch} = 2$, reserved |
| 30 | 2 | $N_{rep,pdsch} = 4$, reserved |
| 31 | 2 | $N_{rep,pdsch} = 8$, reserved |

FIGURE 13

| TABLE 8 | | |
|---|---|---|
| MCS Index $I_{MCS}$ | Modulation Order $Q_m$ | TBS Index for MTC $I_{TBS}$ |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 4 | 12 |
| 13 | 4 | 13 |
| 14 | 2 | $I_{TBS} = 0$, $N_{rep,pdsch} = 2$ |
| 15 | 2 | $I_{TBS} = 0$, $N_{rep,pdsch} = 4$ |
| 16 | 2 | $I_{TBS} = 0$, $N_{rep,pdsch} = 6$ |
| 17 | 2 | $I_{TBS} = 0$, $N_{rep,pdsch} = 8$ |
| 18 | 2 | $I_{TBS} = 0$, $N_{rep,pdsch} = 10$ |
| 19 | 2 | $I_{TBS} = 3$, $N_{rep,pdsch} = 2$ |
| 20 | 2 | $I_{TBS} = 3$, $N_{rep,pdsch} = 4$ |
| 21 | 2 | $I_{TBS} = 3$, $N_{rep,pdsch} = 6$ |
| 22 | 2 | $I_{TBS} = 3$, $N_{rep,pdsch} = 8$ |
| 23 | 2 | $I_{TBS} = 3$, $N_{rep,pdsch} = 10$ |
| 24 | 2 | $I_{TBS} = 6$, $N_{rep,pdsch} = 2$ |
| 25 | 2 | $I_{TBS} = 6$, $N_{rep,pdsch} = 4$ |
| 26 | 2 | $I_{TBS} = 6$, $N_{rep,pdsch} = 6$ |
| 27 | 2 | $I_{TBS} = 6$, $N_{rep,pdsch} = 8$ |
| 28 | 2 | $I_{TBS} = 6$, $N_{rep,pdsch} = 10$ |
| 29 | 2 | $N_{rep,pdsch} = 2$, reserved |
| 30 | 2 | $N_{rep,pdsch} = 4$, reserved |
| 31 | 2 | $N_{rep,pdsch} = 8$, reserved |

FIGURE 14

| TABLE 9 | | |
|---|---|---|
| MCS Index $I_{MCS}$ | Modulation Order $Q_m$ | TBS Index for MTC $I_{TBS}$ |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 2 | $I_{TBS} = 0, N_{rep,pdsch} = N_{rep,EPDCCH,0}$ |
| 13 | 2 | $I_{TBS} = 0, N_{rep,pdsch} = N_{rep,EPDCCH,1}$ |
| 14 | 2 | $I_{TBS} = 0, N_{rep,pdsch} = N_{rep,EPDCCH,2}$ |
| 15 | 2 | $I_{TBS} = 0, N_{rep,pdsch} = N_{rep,EPDCCH,3}$ |
| 16 | 2 | $I_{TBS} = 4, N_{rep,pdsch} = N_{rep,EPDCCH,0}$ |
| 17 | 2 | $I_{TBS} = 4, N_{rep,pdsch} = N_{rep,EPDCCH,1}$ |
| 18 | 2 | $I_{TBS} = 4, N_{rep,pdsch} = N_{rep,EPDCCH,2}$ |
| 19 | 2 | $I_{TBS} = 4, N_{rep,pdsch} = N_{rep,EPDCCH,3}$ |
| 20 | 2 | $I_{TBS} = 8, N_{rep,pdsch} = N_{rep,EPDCCH,0}$ |
| 21 | 2 | $I_{TBS} = 8, N_{rep,pdsch} = N_{rep,EPDCCH,1}$ |
| 22 | 2 | $I_{TBS} = 8, N_{rep,pdsch} = N_{rep,EPDCCH,2}$ |
| 23 | 2 | $I_{TBS} = 8, N_{rep,pdsch} = N_{rep,EPDCCH,3}$ |
| 24 | 4 | $I_{TBS} = 11, N_{rep,pdsch} = N_{rep,EPDCCH,0}$ |
| 25 | 4 | $I_{TBS} = 11, N_{rep,pdsch} = N_{rep,EPDCCH,1}$ |
| 26 | 4 | $I_{TBS} = 11, N_{rep,pdsch} = N_{rep,EPDCCH,2}$ |
| 27 | 4 | $I_{TBS} = 11, N_{rep,pdsch} = N_{rep,EPDCCH,3}$ |
| 28 | 2 | $N_{rep,pdsch} = N_{rep,EPDCCH,0}$, reserved |
| 29 | 2 | $N_{rep,pdsch} = N_{rep,EPDCCH,1}$, reserved |
| 30 | 2 | $N_{rep,pdsch} = N_{rep,EPDCCH,2}$, reserved |
| 31 | 2 | $N_{rep,pdsch} = N_{rep,EPDCCH,3}$, reserved |

FIGURE 15

| TABLE 10 | | |
|---|---|---|
| MCS Index $I_{MCS}$ | Modulation Order $Q_m$ | TBS Index for MTC $I_{TBS}$ |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | $I_{TBS} = 0$, $N_{rep,pdsch} = N_{rep,EPDCCH,0}$ |
| 11 | 2 | $I_{TBS} = 0$, $N_{rep,pdsch} = N_{rep,EPDCCH,1}$ |
| 12 | 2 | $I_{TBS} = 0$, $N_{rep,pdsch} = N_{rep,EPDCCH,2}$ |
| 13 | 2 | $I_{TBS} = 0$, $N_{rep,pdsch} = N_{rep,EPDCCH,3}$ |
| 14 | 2 | $I_{TBS} = 3$, $N_{rep,pdsch} = N_{rep,EPDCCH,0}$ |
| 15 | 2 | $I_{TBS} = 3$, $N_{rep,pdsch} = N_{rep,EPDCCH,1}$ |
| 16 | 2 | $I_{TBS} = 3$, $N_{rep,pdsch} = N_{rep,EPDCCH,2}$ |
| 17 | 2 | $I_{TBS} = 3$, $N_{rep,pdsch} = N_{rep,EPDCCH,3}$ |
| 18 | 2 | $I_{TBS} = 6$, $N_{rep,pdsch} = N_{rep,EPDCCH,0}$ |
| 19 | 2 | $I_{TBS} = 6$, $N_{rep,pdsch} = N_{rep,EPDCCH,1}$ |
| 20 | 2 | $I_{TBS} = 6$, $N_{rep,pdsch} = N_{rep,EPDCCH,2}$ |
| 21 | 2 | $I_{TBS} = 6$, $N_{rep,pdsch} = N_{rep,EPDCCH,3}$ |
| 22 | 2 | $I_{TBS} = 9$, $N_{rep,pdsch} = N_{rep,EPDCCH,0}$ |
| 23 | 2 | $I_{TBS} = 9$, $N_{rep,pdsch} = N_{rep,EPDCCH,1}$ |
| 24 | 2 | $I_{TBS} = 9$, $N_{rep,pdsch} = N_{rep,EPDCCH,2}$ |
| 25 | 2 | $I_{TBS} = 9$, $N_{rep,pdsch} = N_{rep,EPDCCH,3}$ |
| 26 | 2 | $N_{rep,pdsch} = N_{rep,EPDCCH,0}$, reserved |
| 27 | 2 | $N_{rep,pdsch} = N_{rep,EPDCCH,1}$, reserved |
| 28 | 2 | $N_{rep,pdsch} = N_{rep,EPDCCH,2}$, reserved |
| 29 | 2 | $N_{rep,pdsch} = N_{rep,EPDCCH,3}$, reserved |
| 30 | 2 | $N_{rep,pdsch} = N_{rep,EPDCCH,3} + N_{rep,EPDCCH,0}$, reserved |
| 31 | 2 | $N_{rep,pdsch} = N_{rep,EPDCCH,3} + N_{rep,EPDCCH,1}$, reserved |

FIGURE 16 ically relates to encoding and decoding a transport block carried by
COMMUNICATING A TRANSPORT BLOCK IN A WIRELESS NETWORK This application is a continuation of U.S. application Ser. No. 15/119,492, filed 17 Aug. 2016, which was the National Stage of International Application No. PCT/EP2016/060818, filed 13 May 2016, which in turn claims the benefit of U.S. Provisional Application No. 62/162,236, filed on 15 May 2015, the disclosures of all of which are incorporated by reference herein in their entireties.

TECHNICAL FIELD

The present application generally relates to communicating a transport block in a wireless network, and specifically relates to encoding and decoding a transport block carried by a number of subframes via repetition or bundling.

BACKGROUND

A communication device may employ one or more interfaces for communicating over a wireless network. Such a communication device may transmit and receive a wide variety of communications. Protocols to support these communications are often oriented toward supporting the exchange of data generated and/or consumed by human beings. However, protocols developed from the perspective of supporting human data communication may be less suitable for supporting communication between machines.

For example, Machine-Type Communication (MTC) may be an important revenue stream for operators and may have huge potential from the operator perspective. Further, it may be efficient, for example, for operators to serve MTC User Equipment (UEs) using already deployed radio access technology, such as 3GPP LTE, as a competitive radio access technology for efficient support of MTC. Lowering the cost of MTC UEs may also be an important enabler for implementation of the concept of "internet of things." For example, MTC UEs used for many applications may require low operational power consumption and may be expected to communicate using infrequent, small-burst transmissions. In addition, there may be a substantial market for machine-to-machine (M2M) use cases of devices deployed deep inside buildings which may require coverage enhancement in comparison to a defined LTE cell coverage footprint.

3GPP LTE Rel-12 defines a UE power saving mode that allows long battery lifetime and defines a new UE category allowing reduced modem complexity. Subsequent releases of 3GPP LTE may further reduce UE cost and provide coverage enhancement. Despite these features, improved wireless communication mechanisms are still needed to support a broad variety of devices and communication being exchanged therewith.

SUMMARY

A first aspect of the disclosure provides a method performed by a communication device for receiving a downlink transmission across a plurality of subframes. The method comprises receiving control information comprising a repetition index and receiving a set indicator for indicating one of a plurality of sets, wherein each set comprises a plurality of subframe values. A number of subframes used to carry the downlink transmission is indicated by a said subframe value, and wherein the said subframe value is indicated by the repetition index within the indicated set.

Thus, a downlink transmission may be received over a plurality of subframes.

In some examples, the downlink transmission is on a Physical Downlink Shared Channel, PDSCH, or the downlink transmission is a transport block.

In some examples, the subframe value indicates a number of subframes used to carry the downlink transmission via repetitions or bundling.

In some examples, the method further comprises receiving the set indicator separately to the receiving of the repetition index.

In some examples, the receiving the set indicator comprises receiving signalling of the set indicator, and, the receiving signalling of the set indicator is on a less frequent basis than the receiving of the repetition index.

In some examples, receiving the set indicator comprises receiving the set indicator from a higher-layer signalling.

In some examples, the higher-layer signalling of the set indicator is RRC signalling.

In some examples, the control information comprises a first field comprising indicating a modulation and coding scheme, and a second field comprises the repetition index.

In some examples, the control information is downlink control information, DCI.

In some examples, the communication device transmits and/or receives with a reduced Radio Frequency (RF) bandwidth, or the communication device is a low-cost, LC, or coverage enhanced, CE, communication device.

In some examples, the method further comprises decoding the downlink transmission according to the number of subframes used to carry the downlink transmission.

A second aspect of the disclosure provides a communication device comprising communication circuitry configured to send and receive wireless communication, and processing circuitry communicatively coupled to the communication circuitry. The communication circuitry and processing circuitry is configured to receive a downlink transmission across a plurality of subframes by receiving control information comprising a repetition index, and receiving a set indicator for indicating one of a plurality of sets, wherein each set comprises a plurality of subframe values. A number of subframes used to carry the downlink transmission is indicated by a said subframe value, and wherein the said subframe value is indicated by the repetition index within the indicated set.

In some examples, the communication circuitry and processing circuitry is configured to receive the downlink transmission on a Physical Downlink Shared Channel, PDSCH, or wherein the downlink transmission is a transport block.

In some examples, the subframe value indicates a number of subframes used to carry the downlink transmission via repetitions or bundling.

In some examples, the control information is downlink control information, DCI.

In some examples, the communication circuitry is configured to transmit and/or receive with a reduced Radio Frequency (RF) bandwidth, or the communication device is a low-cost, LC, or coverage enhanced, CE, communication device.

In some examples, the processing circuitry is configured to decode the downlink transmission according to the number of subframes used to carry the downlink transmission.

A third aspect of the disclosure provides a method in a communication device for transmitting a downlink transmission across a plurality of subframes. The method comprises transmitting control information comprising a repetition index, and transmitting a set indicator for indicating one of a plurality of sets, wherein each set comprises a plurality of subframe values. A number of subframes used to carry the downlink transmission is indicated by a said subframe value, and wherein the said subframe value is indicated by the repetition index within the indicated set.

In some examples, the communication device is a base station.

In some examples, the method further comprises transmitting the set indicator separately to the transmitting of the repetition index.

In some examples, transmitting the set indicator comprises transmitting signalling of the set indicator on a less frequent basis than the transmitting of the repetition index.

In some examples, transmitting the set indicator comprises transmitting the set indicator as higher-layer signalling.

In some examples, transmitting the control information comprises transmitting a first field comprising indicating a modulation and coding scheme, and a second field comprises the repetition index.

A fourth aspect of the disclosure provides a communication device comprising communication circuitry configured to send and receive wireless communication, and processing circuitry communicatively coupled to the communication circuitry. The processing circuitry is configured to transmit, via the communication circuitry, a downlink transmission across a plurality of subframes, and transmit, via the communication circuitry, signaling comprising control information comprising a repetition index and a set indicator for indicating one of a plurality of sets, wherein each set comprises a plurality of subframe values. A number of subframes used to carry the downlink transmission is indicated by a said subframe value, and wherein the said subframe value is indicated by the repetition index within the indicated set.

In some examples, the communication device is a base station.

In some examples, the processing circuitry is configured to transmit the set indicator separately to the repetition index.

In some examples, the processing circuitry is configured to transmit the signalling comprising the set indicator on a less frequent basis than the transmitting the signalling comprising the repetition index.

In some examples, the processing circuitry is configured to transmit the set indicator as higher-layer signalling.

In some examples, the processing circuitry is configured to transmit the control information comprising a first field comprising indicating a modulation and coding scheme, and a second field comprising the repetition index.

A further aspect of the disclosure provides a computer program comprising instructions which, when executed by at least one processor of a device, causes the device to carry out the method as claimed in any example.

A further aspect of the disclosure provides a carrier containing the computer program, wherein the carrier is one of an electronic signal, optical signal, radio signal, or computer readable storage medium.

BRIEF DESCRIPTION OF THE DRAWINGS

Embodiments of the present disclosure will now be described, by way of example only, with reference to the accompanying drawings in which:

FIG. 7 shows Table 1, which is a Modulation and TBS index table for Physical Downlink Shared Channel (PDSCH) according to an example of the disclosure;

FIG. 8 shows Table 2, which is a Transport Block Size table (dimension 34×110) where NPRB≤6 PRB according to an example of the disclosure;

FIG. 9 shows Table 3, which is a Repetition (i.e., Subframe) Table for PDSCH according to an example of the disclosure;

FIG. 10 shows Table 4, which is a TBS table with "Vacant Entries" according to an example of the disclosure;

FIG. 11 shows Table 5, which is an MCS Table for NPRB=1 according to an example of the disclosure;

FIG. 12 shows Table 6, which is an MCS Table for NPRB=2 according to an example of the disclosure;

FIG. 13 shows Table 7, which is an MCS Table for NPRB=3 according to an example of the disclosure;

FIG. 14 shows Table 8, which is an MCS Table for NPRB=4 according to an example of the disclosure;

FIG. 15 shows Table 9, which is an MCS Table for NPRB=5 according to an example of the disclosure; and FIG. 16 shows Table 10, which is an MCS Table for NPRB=6 according to an example of the disclosure.

DETAILED DESCRIPTION

For simplicity and illustrative purposes, the present disclosure is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention. For example, although the present disclosure will often refer to communication devices herein as UEs, other wireless communication devices may be used according to one or more embodiments.

Figure 1:
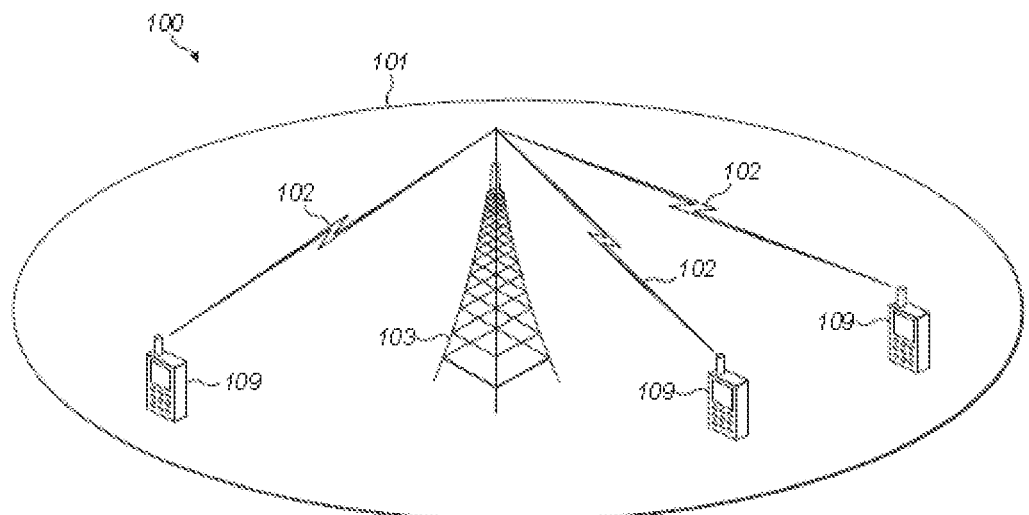
FIG. 1 shows an example network according to an example of the disclosure.

FIG. 1 shows an example communications network 100 in which embodiments relate to transmission or signaling information indicating the numbers of subframes used for a transmission via repetition or bundling. Aspects relate to determining a number of subframes used to carry the transmission via repetition or bundling. The transmission may be a transport block carried across a plurality of subframes via repetition or bundling. The communications network 100 may apply to one or more radio access technologies such as for example LTE, LTE Advanced, WCDMA, GSM, or any 3GPP or other radio access technology.

The communications network 100 comprises network communication devices such as e.g. a base station 103 serving a cell 101. The base station 103 may be a base station such as a Radio Base Station, NodeB, an evolved NodeB (eNB), depending on the technology and terminology used, or any other network unit capable to communicate over a radio carrier 102 with one or more user equipment 109 being present in the cell 101. The radio carrier 102 may also be referred to as carrier, radio channel, channel, communication link, radio link or link.

The user equipment 105 present within the cell 101 and served by the base station 103 is in this case capable of communicating with the base station 103 over the radio carrier 102. A data stream(s) is communicated between the base station 103 and the user equipment(s) 109 over the radio channel 102. The user equipment may alternatively be referred to as a communication device.

According to one or more embodiments, a communication device may transmit and/or receive with a reduced Radio Frequency (RF) bandwidth. For example, a communication device may transmit and/or receive using an RF that is different from a baseband bandwidth. Further, the communication device may make a Modulation and Coding Scheme (MCS) determination that permits repetition across subframes. Thus, according to one or more embodiments, MCS determination and Transport Block Size (TBS) determination methods may be improved over existing systems. For example, support for a reduced UE RF bandwidth of 1.4 MHz in downlink and uplink may be introduced within any system bandwidth. Further, one or more embodiments enable transport block reception using repetitions or bundling across subframes. According to one or more embodiments, the introduction of this reduced UE RF bandwidth support enables a reduction in UE cost, and may be particularly relevant to low-cost (LC) and coverage enhanced (CE) UEs. One or more embodiments may generally discuss solutions to support the exchange of a transport block between wireless devices in a wireless network. A communication device may be, for example, an MTC UE. One or more embodiments may additionally or alternatively include a communication device that may be limited to not more than 1.4 MHz of Radio Frequency (RF) bandwidth in a Long Term Evolution (LTE) system having wider system bandwidth available.

Communicating a transport block may require a Modulation and Coding Scheme (MCS) determination. When the transport block is not carried across multiple subframes via repetition or bundling, a receiving UE may use a modulation order (Qm) of 2, if the Downlink Control Information (DCI) Cyclic Redundancy Check (CRC) is scrambled by Paging Radio Network Temporary Identifier (P-RNTI), Random Access RNTI (RA-RNTI), or System Information RNTI (SI-RNTI). Otherwise, when higher-order modulation 256-Quadrature Amplitude Modulation (QAM) is not enabled the communication device may use a table, such as Table 1 below, to determine the modulation order (Qm) used, for example, in the physical downlink shared channel. Table 1 shows a Modulation and TBS index table for Physical Downlink Shared Channel (PDSCH).

For transport block size (TBS) determination, for $0 \leq I_{MCS} \leq 28$, the communication device may first determine the TBS index ($I_{TBS}$) using $I_{MCS}$ and the Table 1. For transport blocks not mapped to two or more layer spatial multiplexing, the TBS may be given by the ($I_{TBS}$, $N_{PRB}$) entry in Table 2. Table 2 shows a Transport Block Size table (dimension 34×110) where $N_{PRB} \leq 6$ PRB.

One or more embodiments of the present disclosure include methods, devices, systems, and computer program products to provide MCS determination and TBS determination, for example, for LTE communication. For example, an embodiment may include improvements over existing LTE Rel-13 LC/CE UEs. For example, one or more link adaptation mechanisms for LC/CE UEs where repetition or bundling across several subframes may be supported. For example, one or more embodiments may support UE operation across a wide range of Signal-to-Interference-plus-noise ratio (SINR) conditions. For example, in high SINR conditions the UE may use modulation level up to 64-QAM and require no repetition/bundling across subframes. For further example, in medium SINR conditions, the UE may not be able to utilize high-level modulation like 64-QAM (i.e., only use low-level modulation like Quadrature Phase Shift Keying (QPSK) and 16-QAM), and may require a low number of repletion/bundling across subframes. For yet further example, in low SINR conditions, the UE may use lowest-level modulation (e.g., QPSK) only, and require a large number of repetition/bundling across subframes.

One or more embodiments may involve a communication device in which multiple repetitions across subframes is necessary for low-cost (LC) as well as coverage-enhanced (CE) UEs. The number of repetitions may, for example, be up to ~300 subframes to reach a UE with 15 dB lower SINR than normal cell-edge. It may also be advantageous to provide for UE in normal coverage, where the UE needs to use a similar MCS table and TBS determination mechanism as in a legacy system. Thus various link adaptation methods as proposed herein may be flexible to provide a wide range of combinations of {TBS, modulation order, code rate}, where the code rate includes not only the parameters within a subframe but also the number of repetition/bundling across subframes. Here, repetition indicates simple duplication of code bits associated with a same transport block (TB) from subframe to subframe, whereas bundling indicates that code bits associated with a same transport block (TB) may vary from subframe to subframe due to rate matching mechanism.

One or more of the MCS and TBS determination methods described herein for LC/CE UEs may satisfy the following Rel-13 MTC conditions: (a) the maximum transmit and receive bandwidth may be 1.4 MHz (or 6 Physical Resource Blocks (PRBs)); (b) the maximum TBS a UE may be required to receive in a PDSCH may be, approximately, 1000 bits; (c) if a large number of repetitions are needed, it may be preferable to use more PRBs (e.g., 6 PRBs) to reduce the number of subframes needed for repetition or bundling.

According to one embodiment, first and second (i.e., two) DCI fields are defined and carried by the Enhanced Physical Downlink Control Channel. One of the DCI fields may be a 5-bit MCS and redundancy version field that provides an MCS Index $I_{MCS}$. Using $I_{MCS}$, Modulation Order $Q_m$, and TBS Index $I_{TBS}$ are looked up. The other field may be a repetition index (alternately called a subframe index). The repetition (i.e., subframe) index may be optional. When the repetition index does not exist in the DCI, it may mean no repetition/bundling is done across subframes (i.e., $N_{rep,pdsch,i}=1$). When $N_{rep,pdsch,i}=1$, it may indicate that PDSCH is transmitted within a single subframe only (i.e., no repetition across subframes). When this repetition index field exists in the DCI, Repetition Index $I_{rep,pdsch}$ may be used to look-up the number of repetition of PDSCH using a table. As an example, a 2-bit Repetition Index $I_{rep,pdsch}$ and the table are shown in Table 3. Table 3 shows a Repetition (i.e., Subframe) Table for PDSCH. In this table, {$N_{rep,pdsch,0}$, $N_{rep,pdsch,1}$, $N_{rep,pdsch,2}$, $N_{rep,pdsch,3}$} is a set of integer numbers ($\geq 1$) that indicates the number of subframes used to carry a given PDSCH transmission via repetitions or bundling. In some examples, the repetition is indicated by a combination of a set and an index within the set. The set may be signaled separately to the index, e.g., on less frequent basis. The set $S_{rep}=\{N_{rep,pdsch,i}\}$, i=0, 1, 2, 3, may be provided by higher-layer signaling (e.g., RRC signaling). The set may be signaled semi-statically. Several sets of $S_{rep}$ may be defined, e.g., one per level of coverage enhancement. The higher-layer signaling (e.g., RRC signal) may indicate j, i.e., which set $S_{rep}(j)$ should be used when looking up Table 1 with $I_{rep,pdsch}$. For example:

$S_{rep}(0)=\{1, 2, 3, 4\}$ for UEs with a medium-high SINR, for example, normal-cost UEs at cell edge;

$S_{rep}(1)=\{5, 10, 15, 20\}$ for UEs with medium-low SINR, for example, UEs with 3-5 dB of coverage enhancement;

$S_{rep}(2)=\{10, 20, 30, 40\}$ for UEs with low SINR, for example, UEs with 5-10 dB of coverage enhancement;

$S_{rep}(3)=\{40, 100, 160, 240\}$ for UEs with very low SINR, for example, UEs with 10-15 dB of coverage enhancement.

The set $S_{rep}(j)$ may be provided specifically for PDSCH transmission. Alternatively, set $S_{rep}(j)$ may be provided implicitly, for example, via a set of repetition levels pertaining to the EPDCCH (e.g., the repetition levels the EPDCCH should use).

According to one or more embodiments, the use of the Repetition Index field results in a relatively larger DCI size.

The PDSCH transmission may be considered as an example of a downlink transmission.

Alternatively, rather than include a Repetition Index field in the DCI, a field indicating the number of repetitions to use may be embedded in the 5-bit field "Modulation and coding scheme and redundancy version." This MCS and redundancy version field may, for example, be modified for LC/CE UEs. According to one or more embodiments, this embedding may involve a DCI that is relatively smaller than including a separate Repetition Index, as described above. This embedding allows the same size of a 5-bit field to be used, to carry both the Modulation and coding scheme and the repetition information.

Since some embodiments may include LC/CE UEs that may not be required to receive TBS more than 1000 bits, ordinary TBS tables may comprise entries that may not be useful for certain UEs (e.g., since LC/CE UEs are not required to receive TBS more than 1000 bits, TBS entries larger than 1000 bits may be considered "vacant entries"). Table 4 is an example of a table comprising these so-called "vacant entries" (note that the "vacant entries" are illustrated within table section 200). Table 4 shows a TBS Table with "Vacant Entries". Rather than provide non-applicable indices, these indices may instead be used to provide information on the number of repetitions to use. Since different number vacant entries may be available for different NPRB, different NPRB value may require a different MCS mapping table. One example involving a field indicating the number of repetitions to use that is embedded in the MCS and redundancy version field may be to construct a set of MCS mapping tables as shown in Tables 5-Table 10.

In one embodiment, the number of repetitions is fixed and predefined in the specification. This is used in Tables 5-8, where the number of PRB used for transport block transmission is small: $N_{PRB}=1, 2, 3, 4$.

In another embodiment, the number of repetitions are not fixed, and use values provided from higher layer (e.g., RRC signaling). This is used in Tables 9-10, where the number of PRB used for TB transmission is larger, e.g., $N_{PRB}=5,6$. Specifically, the higher-layer provided number-of-repetitions may reuse the set of repetition levels provided to the Physical Downlink Control Channel (PDCCH) of LC/CE UEs. Let $\{N_{rep,EPDCCH,0}, N_{rep,EPDCCH,1}, N_{rep,EPDCCH,2}, N_{rep,EPDCCH,3}\}$ be, for example, the number of repetitions across subframes configured for EPDCCH of the given UE. The MCS table for the PDSCH of MTC UE may be defined utilizing the repetition levels of a particular control channel, e.g., EPDCCH. Note that one or more embodiments may specifically define a set of repetition levels for PDSCH, not via $N_{rep,EPDCCH,i}$ of EPDCCH.

In the tables, some of the example MCS indices $I_{MCS}$ are mapped to the combination of $\{I_{TBS}, N_{rep,pdsch}\}$, where $I_{TBS}$ is used to look up transmission block size and $N_{rep,pdsch}$ is the number of subframes used to carry a PDSCH transmission via repetition/bundling. For example, in Table 6, $I_{MCS}=26$ indicates using modulation order $Q_m=2$ (i.e., QPSK) and the combination of $\{I_{TBS}=2, N_{rep,pdsch}=4\}$. In some examples, the field previously used to indicate the TBS index $I_{TBS}$ indicates both the TBS index and the number of repetitions. In some examples, the field previously used to indicate the TBS index $I_{TBS}$ indicates the number of repetitions only.

In Tables 5-10, each table contains reserved entries. The reserved values may be used during PDSCH retransmission, where they may define the number of repetition/bundling across time a PDSCH retransmission should use. Table 5 shows a MCS Table for NPRB=1. For example, in Table 5, $I_{MCS}=30$ may indicate that for the PDSCH retransmission, the modulation order is 2 (i.e., QPSK), and the number of repetition/bundling across subframes is $N_{rep,pdsch}=4$ (i.e., 4 subframes may be used in the retransmission of the given transmission block). Examples of the disclosure are seen in Table 5, for the TBS index value corresponding to MCS Index 27 to 31, in Table 6, for the TBS index value corresponding to MCS Index 22 to 31, in Table 7, for the TBS index value corresponding to MCS Index 17 to 31, Table 8, for the TBS index value corresponding to MCS Index 14 to 31, Table 9, for the TBS index value corresponding to MCS Index 12 to 31, Table 10, for the TBS index value corresponding to MCS Index 10 to 31. Table 6 shows a MCS Table for NPRB=2. Table 7 shows a MCS Table for NPRB=3. Table 8 shows a MCS Table for NPRB=4. Table 9 shows a MCS Table for NPRB=5. Table 10 shows a MCS Table for NPRB=6.

Although a TBS index value is conventionally assigned to these fields, it has been appreciated that the corresponding transport block size exceeds that which is useable, and so can be re-used to carry (or additionally carry) the repetition information.

For Tables 5-10, $I_{TBS}=9$ and $I_{TBS}=15$ only appear once in each table, rather than twice as in a legacy system, for example. This may be applied to increase the number of values usable for indicating combinations of $\{I_{TBS}=2, N_{rep,pdsch}=4\}$.

Figure 2:
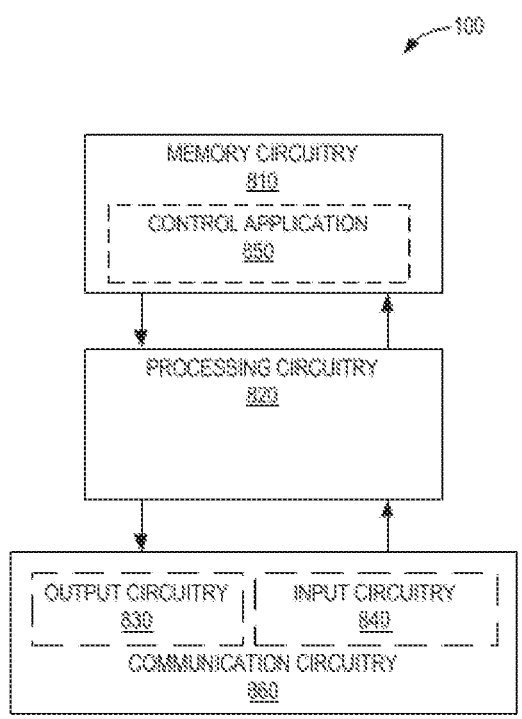
FIG. 2 shows a communication device according to an example of the disclosure.

Further, one or more embodiments may comprise the example hardware depicted in FIG. 2. The communication device 100 comprises processing circuitry 820 that is communicatively coupled to memory circuitry 810 and communication circuitry 860, e.g., via one or more buses. The processing circuitry 820 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry may be programmable hardware capable of executing machine instructions stored as a machine-readable computer program 850 in the memory circuitry 810. The memory circuitry 810 of the various embodiments may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The communication circuitry 860 may be configured to send and receive wireless communication over a wireless communication network. For example, the communication circuitry 860 may be a transceiver. According to embodiments, the communication circuitry 860 may comprise distinct output circuitry 830, and input circuitry 840. The output circuitry 830 may be configured to send communication signals over a wireless communications network. For example, the output circuitry 830 may be a transmitter. The input circuitry 840 may be configured to receive communication signals over a wireless communications network. For example, the input circuitry 840 may be a receiver. When implemented as distinct respective components, the output circuitry 830 and input circuitry 840 may be communicatively coupled to each other, or may communicate with each other via the processing circuitry 820.

According to one embodiment, the processing circuitry 820 is configured to determine a number of subframes used to carry a transport block via repetition or bundling, and decode the transport block according to the determined number of subframes.

According to a different embodiment the processing circuitry 820 is configured to transmit, via the communication circuitry 860, a transport block via repetition or bundling across a plurality of subframes and transmit, via the communication circuitry 860, Downlink Control Information (DCI) for decoding the transport block.

Figure 3:
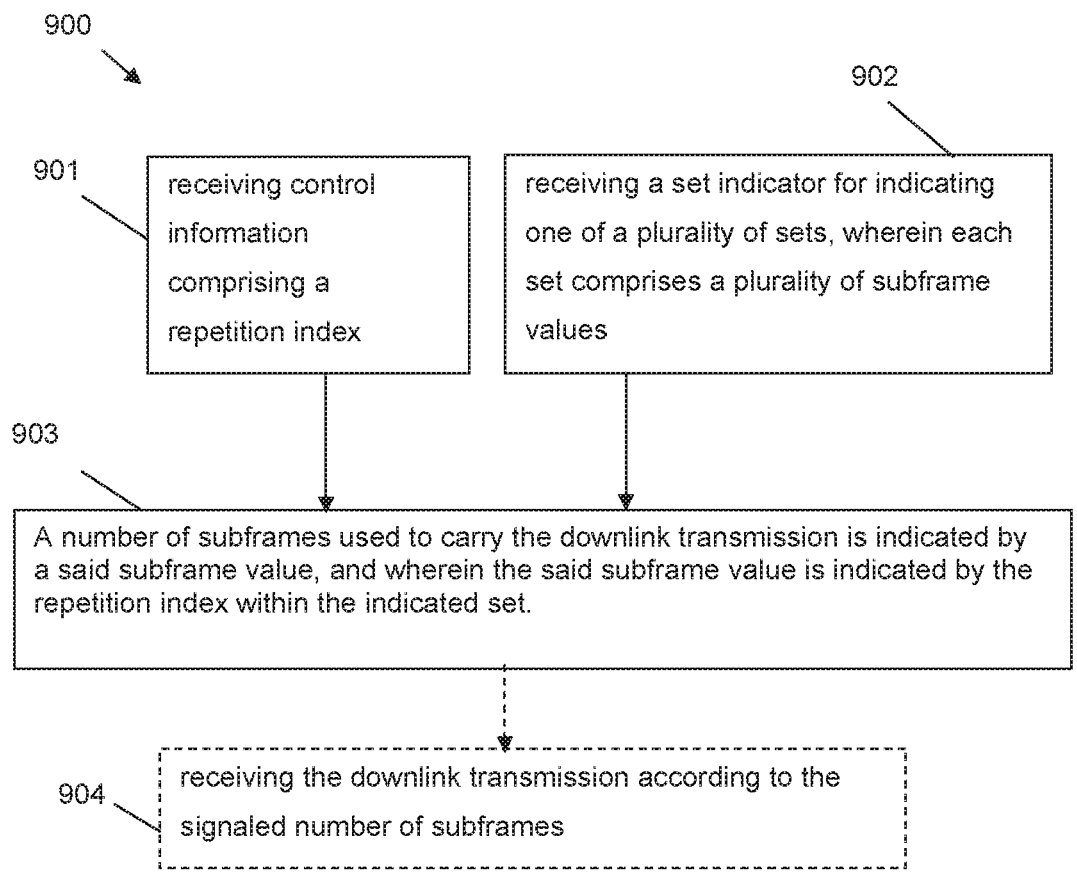
FIG. 3 shows a method of a communication device according to an example of the disclosure.

FIG. 3 shows a method 900 performed by a communication device for receiving a downlink transmission across a plurality of subframes. In some examples, the communication device is a user equipment. The method 900 comprises receiving in 901 control information comprising a repetition index.

The method 900 further comprises receiving 902 a set indicator for indicating one of a plurality of sets. Each set comprises a plurality of subframe values.

In some examples, the method aspects 901,902 may be performed in any order. In some examples, receiving 902 the set indicator may be separate to the receiving 901 of the repetition index. In some examples, receiving 902 the set indicator comprises receiving signalling of the set indicator, and, the receiving signalling of the set indicator is on a less frequent basis than the receiving 901 of the repetition index.

In some examples, receiving 902 the set indicator comprises receiving the set indicator from a higher-layer signalling. In some examples, the higher-layer signalling of the set indicator is RRC signalling.

In 903, a number of subframes used to carry the downlink transmission is indicated by a said subframe value, and wherein the said subframe value is indicated by the repetition index within the indicated set.

In some examples, in 903 the communication device determines the number of subframes from the indicated subframe value which is indicated by the repetition index within the indicated set. In some examples, the subframe value identified by the set and repetition index is the number of subframes over which the downlink transmission (e.g. PDSCH transmission) is received. In some aspects, 903 may be considered as using the repetition index to select one of the subframe values from the indicated set. The selected subframe value indicates a number of subframes used to carry the downlink transmission. In some aspects, the number of subframes may be considered as determined by the repetition index.

In some examples, the method 900 optionally comprises receiving 904 the downlink transmission according to the signaled number of subframes.

Figure 4:
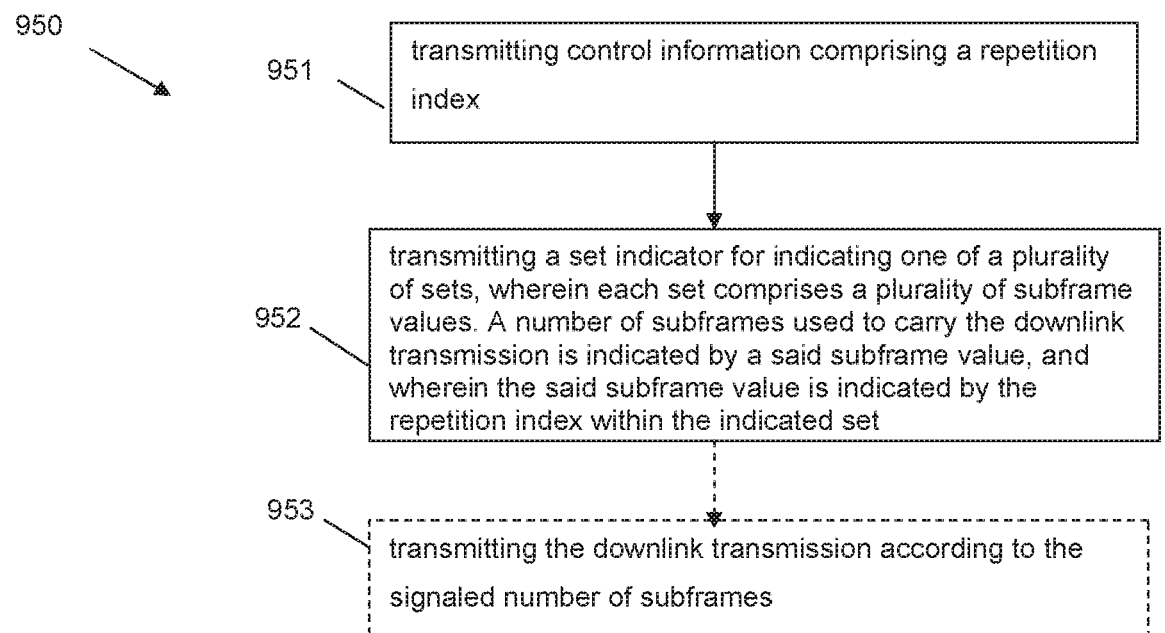
FIG. 4 shows a method of a further communication device according to an example of the disclosure.

FIG. 4 shows a method 950 in a communication device for transmitting a downlink transmission across a plurality of subframes. In some examples, the communication device is a base station, e.g. eNB. The method 950 comprises transmitting 951 control information comprising a repetition index. The method 950 further comprises transmitting 952 a set indicator for indicating one of a plurality of sets. Each set comprises a plurality of subframe values. A number of subframes used to carry the downlink transmission is indicated by a said subframe value, and wherein the said subframe value is indicated by the repetition index within the indicated set.

In some examples, the method 950 optionally comprises transmitting 953 the downlink transmission according to the signaled number of subframes.

In some aspects, the repetition index is for selecting one of the subframe values from the indicated set, and the selected subframe value indicates a number of subframes used to carry the downlink transmission.

In some examples, transmitting the set indicator 952 is separate to the transmitting 951 of the repetition index. In some examples, transmitting 952 the set indicator comprises transmitting signalling of the set indicator on a less frequent basis than the transmitting 951 of the repetition index. In some examples, transmitting 952 the set indicator comprises transmitting the set indicator as higher-layer signalling.

In some examples, transmitting 951 the control information comprises transmitting a first field comprising indicating a modulation and coding scheme, and a second field comprises the repetition index.

Abbreviations:
3GPP 3rd Generation Partnership Project
BW Bandwidth
DL Downlink
DCI Downlink control information
eNB Evolved Node-B
FDD Frequency Division Duplexing
LTE Long term evolution
MTC Machine Type Communication
EPDCCH Enhanced Physical Downlink Control Channel
PDSCH Physical downlink share channel
PDCCH Physical downlink control channel
PRB Physical Resource Block
PUCCH Physical Uplink Control Channel
PUSCH Physical Uplink Shared Channel
RB Resource Block
TDD Time Division Duplexing
UE User Equipment
UL Uplink
RRC Radio Resource Control The present invention may, of course, be carried out in other ways than those specifically set forth herein without departing from essential characteristics of the invention. The present embodiments are to be considered in all respects as illustrative and not restrictive.

Those skilled in the art will appreciate that embodiments herein generally include a method implemented by a communication device (e.g., a low cost or coverage enhanced MTC device) in a wireless communication network. The method is for decoding a transport block (e.g., received by the device over a PDSCH in an LTE network). The method may comprise determining a number of subframes used to carry the transport block via repetition or bundling, and decoding the transport block according to the determined number of subframes, e.g., by determining a modulation and coding scheme (MCS) and a transport block size (TBS) for the transport block according to the determined number of subframes.

In at least some embodiments, this entails receiving a downlink control information (DCI) over a control channel (e.g., receiving LTE DCI over an EPDCCH in LTE), and determining the number of subframes used to carry the transport block via repetition or bundling based on that received information.

In one or more embodiments, for example, determining the number of subframes based on the DCI comprises using an index or field (e.g., referred to as a "subframe index') within the DCI to reference a subframe table indicating the number of subframes used to carry the transport block via repetition or bundling. In some aspects, a DCI field provides an indicator for repetition or bundling across subframes. In at least one embodiment, the device receives signaling (e.g., RRC signaling), via the wireless communication network, the signaling comprising a set of subframe values indicating a plurality of potential numbers of subframes (e.g., a set) used to carry the transport block via repetition or bundling, and populates the subframe table with the set of subframe values received via the signaling. In this case, using the subframe index to reference the subframe table comprises using the subframe index to select one of the set of subframe values within the subframe table.

In one or more embodiments, therefore, a subframe table may be dynamically populated with different sets of subframe values at different times, for different types of devices, for different cost or coverage requirements of different devices, or any combination thereof.

In some embodiments, the signaling explicitly indicates the set of subframe values. Alternatively, the signaling may implicitly indicate the set. For example, in one embodiment, the signaling is control information pertaining to repetition levels of a different channel, such as an Enhanced Physical Downlink Control Channel in LTE. In this case, the repetition level applicable for receiving the transport block is implied from or inherits the repetition level for receiving a different transmission.

Alternatively to using a dedicated subframe index and subframe table as described above, one or more other embodiments herein entail determining the number of subframes using a Modulation and Coding Scheme (MCS) index within the DCI to reference an MCS table indicating each of a modulation order, a Transport Block Size index, and/or the number of subframes. For example, one or more MCS indexes in the MCS table may be mapped to a certain combination of modulation order, TBS index, and number of subframes. In at least some embodiments, only a portion of the MCS indexes in the MCS table are mapped to such a combination, while others of the MCS indexes are just mapped to a certain combination of modulation order and TBS index (without indicating the number of subframes). The portion of MCS indexes mapped to a combination that includes a number of subframes may include, for instance, indexes that are applicable to or necessary for some devices or some circumstances in the network, but are not particularly applicable to or necessary for this device or under the current circumstances. In some examples, an MCS index is transmitted and received in the DCI, the MCS index having a plurality of possible values. One or more values of the MCS index provide an indication of modulation order and transport block size only (i.e. no indication of repetition or bundling across subframes). A different one or more values of the MCS index indicate repetition or bundling across subframes. In some aspects, the MCS index value also indicates modulation order. Optionally, the MCS index value also indicates transport block size. The MCS index values used for indicating repetition or bundling across subframes may correspond to a transport block size being over a threshold (e.g., 1000), and identified as not used in certain types of communication, e.g. as described. As such, a single MCS index value (5 bits) is able to indicate modulation order, transport block size, and in a portion only of values, indicates the number of repetition or bundling across subframes. In some aspects, the transport block size may be defined in association with the PRB number. The MCS index may indicate the repetition or bundling across subframes in association with the PRB number.

Embodiments herein also include a method for encoding a transport block implemented by a communication device (e.g., a base station, e.g., eNB) in a wireless communication network. The method comprises transmitting a transport block across a plurality of subframes via repetition or bundling (e.g., over a PDSCH in LTE). The method also entails transmitting signaling (e.g., as RRC signaling or over an EPDCCH in LTE) for decoding the transport block that indicates the number of subframes and/or a set of potential numbers of subframes over which the transport block is transmitted via repetition or bundling. The transmitted signaling indicating the numbers of subframes over which the transport block is transmitted via repetition or bundling may be as described in any example.

In some embodiments, transmitting the signaling comprise transmitting a subframe index within downlink control information (DCI). This subframe index (or field), when used as a reference into a subframe table, indicates a number of subframes in the plurality of subframes.

Alternatively or additionally, the signaling may indicate a set of subframe values indicating a plurality of potential numbers of subframes used to carry the transport block via repetition or bundling. In this case, a subframe index in the signaling may indicate one of the set of subframe values.

In some embodiments, transmitting the signaling comprises transmitting the signaling via control information pertaining to repetition levels of an Enhanced Physical Downlink Control Channel.

Alternatively or additionally, transmitting the DCI comprises transmitting a Modulation and Coding Scheme (MCS) index within the DCI that, when the MCS index is used as a reference into an MCS table, indicates each of a modulation order, a Transport Block Size index, and the number of subframes in the plurality of subframes.

One or more embodiments herein also include corresponding communication devices, computer programs, and computer program products.

A communication device may comprise for example communication circuitry configured to send and receive wireless communication, and processing circuitry communicatively coupled to the communication circuitry. The processing circuitry may be configured to determine a number of subframes used to carry a transport block via repetition or bundling, and decode the transport block according to the determined number of subframes. The device may be otherwise configured as described above.

A communication device according to other embodiments comprises communication circuitry configured to send and receive wireless communication, and processing circuitry communicatively coupled to the communication circuitry. The processing circuitry is configured to transmit, via the communication circuitry, a transport block via repetition or bundling across a plurality of subframes, and transmit, via the communication circuitry, signaling for decoding the transport block. The device may be otherwise configured as described above.

A computer program comprises instructions which, when executed by at least one processor of a device, causes the device to carry out any of the methods herein.

A carrier contains the computer program above, wherein the carrier is one of an electronic signal, optical signal, radio signal, or computer readable storage medium.

An aspect of the disclosure provides a method performed by a communication device for receiving a downlink transmission across a plurality of subframes. The method comprises receiving control information comprising a repetition index and receiving a set indicator for indicating one of a plurality of sets, wherein each set comprises a plurality of subframe values. A number of subframes used to carry the downlink transmission is indicated by a said subframe value, and wherein the said subframe value is indicated by the repetition index within the indicated set. Thus, a downlink transmission may be received over a plurality of subframes.

In some examples, the downlink transmission is on a Physical Downlink Shared Channel, PDSCH, or the downlink transmission is a transport block. In some examples, the subframe value indicates a number of subframes used to carry the downlink transmission via repetitions or bundling. In some examples, the method further comprises receiving the set indicator separately to the receiving of the repetition index. In some examples, the receiving the set indicator comprises receiving signalling of the set indicator, and, the receiving signalling of the set indicator is on a less frequent basis than the receiving of the repetition index. In some examples, receiving the set indicator comprises receiving the set indicator from a higher-layer signalling. In some examples, the higher-layer signalling of the set indicator is RRC signalling.

In some examples, the control information comprises a first field comprising indicating a modulation and coding scheme, and a second field comprises the repetition index. In some examples, the control information is downlink control information, DCI. In some examples, the communication device transmits and/or receives with a reduced Radio Frequency (RF) bandwidth, or the communication device is a low-cost, LC, or coverage enhanced, CE, communication device. In some examples, the method further comprises decoding the downlink transmission according to the number of subframes used to carry the downlink transmission.

A further aspect of the disclosure provides a communication device comprising communication circuitry configured to send and receive wireless communication, and processing circuitry communicatively coupled to the communication circuitry. The communication circuitry and processing circuitry is configured to receive a downlink transmission across a plurality of subframes by receiving control information comprising a repetition index, and receiving a set indicator for indicating one of a plurality of sets, wherein each set comprises a plurality of subframe values. A number of subframes used to carry the downlink transmission is indicated by a said subframe value, and wherein the said subframe value is indicated by the repetition index within the indicated set.

In some examples, the communication circuitry and processing circuitry is configured to receive the downlink transmission on a Physical Downlink Shared Channel, PDSCH, or wherein the downlink transmission is a transport block. In some examples, the subframe value indicates a number of subframes used to carry the downlink transmission via repetitions or bundling. In some examples, the control information is downlink control information, DCI.

In some examples, the communication circuitry is configured to receive the set indicator separately to the repetition index. In some examples, the communication circuitry is configured the set indicator on a less frequent basis than the repetition index. In some examples, communication circuitry and processing circuitry is configured to receive the set indicator from a higher-layer signalling. In some examples, the higher-layer signalling of the set indicator is RRC signalling. In some examples, the communication circuitry is configured to receive control information comprising a first field comprising indicating a modulation and coding scheme, and a second field comprises the repetition index. In some examples, the control information is downlink control information, DCI.

In some examples, the communication circuitry is configured to transmit and/or receive with a reduced Radio Frequency (RF) bandwidth, or the communication device is a low-cost, LC, or coverage enhanced, CE, communication device. In some examples, the processing circuitry is configured to decode the downlink transmission according to the number of subframes used to carry the downlink transmission.

A further aspect of the disclosure provides a method in a communication device for transmitting a downlink transmission across a plurality of subframes. The method comprises transmitting control information comprising a repetition index, and transmitting a set indicator for indicating one of a plurality of sets, wherein each set comprises a plurality of subframe values. A number of subframes used to carry the downlink transmission is indicated by a said subframe value, and wherein the said subframe value is indicated by the repetition index within the indicated set.

In some examples, the communication device is a base station. In some examples, the method further comprises transmitting the set indicator separately to the transmitting of the repetition index. In some examples, transmitting the set indicator comprises transmitting signalling of the set indicator on a less frequent basis than the transmitting of the repetition index.

In some examples, transmitting the set indicator comprises transmitting the set indicator as higher-layer signalling. In some examples, transmitting the control information comprises transmitting a first field comprising indicating a modulation and coding scheme, and a second field comprises the repetition index.

In some examples, the downlink transmission is on a Physical Downlink Shared Channel, PDSCH, or the downlink transmission is a transport block. In some examples, the subframe value indicates a number of subframes used to carry the downlink transmission via repetitions or bundling. In some examples, the higher-layer signalling of the set indicator is RRC signalling.

In some examples, the control information is downlink control information, DCI. In some examples, the communication device transmits and/or receives with a reduced Radio Frequency (RF) bandwidth, or the communication device communicates with a low-cost, LC, or coverage enhanced, CE, communication device.

A further aspect of the disclosure provides a communication device comprising communication circuitry configured to send and receive wireless communication, and processing circuitry communicatively coupled to the communication circuitry. The processing circuitry is configured to transmit, via the communication circuitry, a downlink transmission across a plurality of subframes, and transmit, via the communication circuitry, signaling comprising control information comprising a repetition index and a set indicator for indicating one of a plurality of sets, wherein each set comprises a plurality of subframe values. A number of subframes used to carry the downlink transmission is indicated by a said subframe value, and wherein the said subframe value is indicated by the repetition index within the indicated set.

In some examples, the communication device is a base station. In some examples, the processing circuitry is configured to transmit the set indicator separately to the repetition index. In some examples, the processing circuitry is configured to transmit the signalling comprising the set indicator on a less frequent basis than the transmitting the signalling comprising the repetition index. In some examples, the processing circuitry is configured to transmit the set indicator as higher-layer signalling. In some examples, the processing circuitry is configured to transmit the control information comprising a first field comprising indicating a modulation and coding scheme, and a second field comprising the repetition index.

In some examples, the communication circuitry is configured to transmit the downlink transmission on a Physical Downlink Shared Channel, PDSCH, or the downlink transmission is a transport block. In some examples, the subframe value indicates a number of subframes used to carry the downlink transmission via repetitions or bundling. In some examples, the higher-layer signalling of the set indicator is RRC signalling.

In some examples, the control information is downlink control information, DCI. In some examples, the communication device transmits and/or receives with a reduced Radio Frequency (RF) bandwidth, or the communication device communicates with a low-cost, LC, or coverage enhanced, CE, communication device.

A further aspect of the disclosure provides a computer program comprising instructions which, when executed by at least one processor of a device, causes the device to carry out the method as described in an example.

A further aspect of the disclosure provides a carrier containing the computer program as described in any example, wherein the carrier is one of an electronic signal, optical signal, radio signal, or computer readable storage medium.

In some aspects, a method performed by a communication device for receiving a downlink transmission across a plurality of subframes, comprises receiving control information comprising a Modulation and Coding Scheme, MCS, index. The MCS index indicates at least one of a Transport Block Size index and a number of subframes (alternatively termed a subframe value). The number of subframes indicates a number of subframes used to carry the downlink transmission.

In some examples, the MCS index indicates at least one of a Transport Block Size index, modulation order and a number of subframes.

In some examples, the MCS index references a MCS table, and only a portion of the MCS indexes in the MCS table are mapped to at least the number of subframes, and only another portion of the MCS indexes are mapped to the Transport Block Size index without indicating the number of subframes.

In some aspects, a transport block size is defined by the Transport Block Size index in association with a Physical Resource Block, PRB, number.

In some aspects, the number of subframes indicates a number of subframes used to carry the downlink transmission via repetitions or bundling.

In some examples, the downlink transmission is on a Physical Downlink Shared Channel, PDSCH. In some examples, the downlink transmission is a transport block.

A further example provides a communication device comprising communication circuitry configured to send and receive wireless communication, and processing circuitry communicatively coupled to the communication circuitry. The communication circuitry and processing circuitry is configured to receive a downlink transmission across a plurality of subframes by receiving control information comprising a Modulation and Coding Scheme, MCS, index. The MCS index indicates at least one of a Transport Block Size index and a number of subframes (alternatively termed a subframe value). The number of subframes indicates a number of subframes used to carry the downlink transmission.

In this example, the communication device may be a user equipment.

A further example provides a communication device comprising communication circuitry configured to send and receive wireless communication, and processing circuitry communicatively coupled to the communication circuitry. The processing circuitry is configured to transmit, via the communication circuitry, a downlink transmission across a plurality of subframes, and transmit, via the communication circuitry, signaling comprising control information comprising a Modulation and Coding Scheme, MCS, index. The MCS index indicates at least one of a Transport Block Size index and a number of subframes (alternatively termed a subframe value). The number of subframes indicates a number of subframes used to carry the downlink transmission.

A further example provides a method in a communication device for transmitting a downlink transmission across a plurality of subframes, comprising: transmitting control information comprising a Modulation and Coding Scheme, MCS, index. The MCS index indicates at least one of a Transport Block Size index and a number of subframes (alternatively termed a subframe value). The number of subframes indicates a number of subframes used to carry the downlink transmission.

In this example, the communication device may be a base station.

In some examples, the MCS index indicates at least one of a Transport Block Size index, modulation order and a number of subframes.

In some examples, the MCS index references a MCS table, and only a portion of the MCS indexes in the MCS table are mapped to at least the number of subframes, and only another portion of the MCS indexes are mapped to the Transport Block Size index without indicating the number of subframes.

In some aspects, a transport block size is defined by the Transport Block Size index in association with a Physical Resource Block, PRB, number.

In some aspects, the number of subframes indicates a number of subframes used to carry the downlink transmission via repetitions or bundling.

In some examples, the downlink transmission is on a Physical Downlink Shared Channel, PDSCH. In some examples, the downlink transmission is a transport block.

Figure 5:
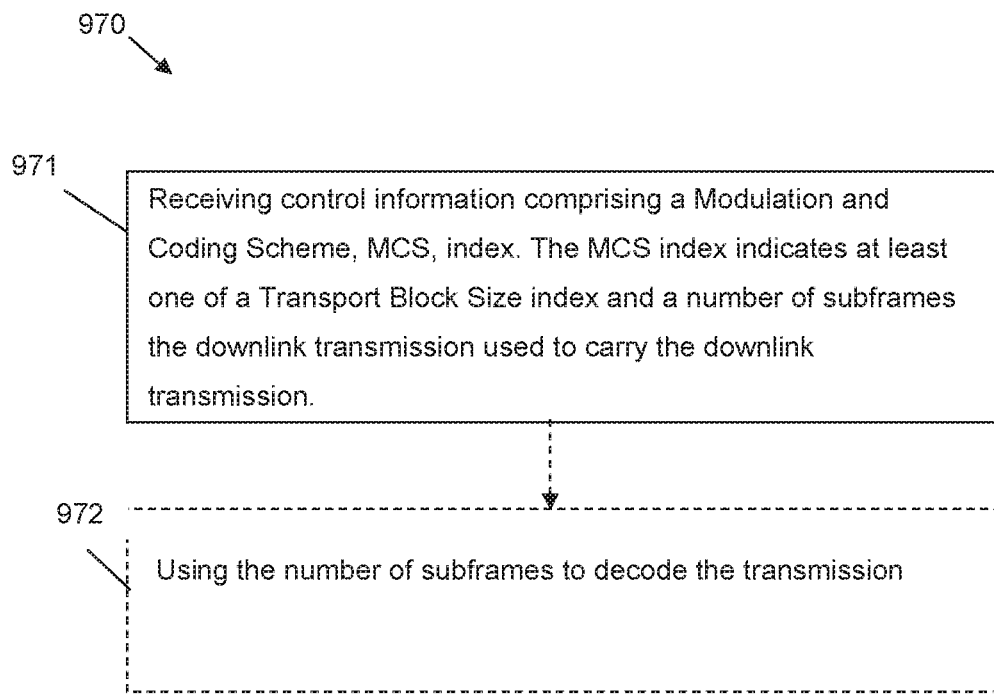
FIG. 5 shows a method of a communication device according to a further example of the disclosure.

FIG. 5 shows a method 970 performed by a communication device for receiving a downlink transmission across a plurality of subframes. In some examples, the communication device is a user equipment. The method 970 comprises receiving in 971 control information comprising a Modulation and Coding Scheme, MCS, index. The MCS index indicates at least one of a Transport Block Size index and a number of subframes (alternatively termed a subframe value). The number of subframes indicates a number of subframes used to carry the downlink transmission.

Optionally in 972, the communication device uses the number of subframes to decode the transmission.

Figure 6:
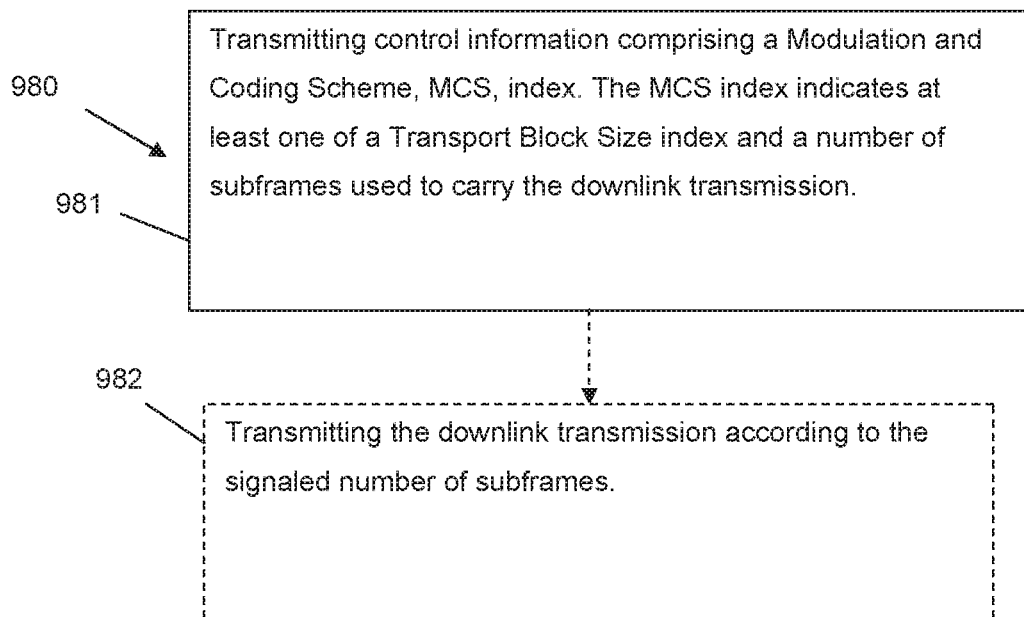
FIG. 6 shows a method of a further communication device according to the further example of the disclosure.

FIG. 6 shows a method 980 in a communication device for transmitting a downlink transmission across a plurality of subframes. In some examples, the communication device is a base station, e.g. eNB. The method 980 comprises transmitting 981 control information comprising a Modulation and Coding Scheme, MCS, index. The MCS index indicates at least one of a Transport Block Size index and a number of subframes (alternatively termed a subframe value). The number of subframes indicates a number of subframes used to carry the downlink transmission.

In some examples, the method 980 optionally comprises transmitting 982 the downlink transmission according to the signaled number of subframes.

Further aspects of the disclosure provide a method performed by a communication device for receiving a downlink transmission across a plurality of subframes. The method comprises receiving control information comprising a repetition index, and receiving a set indicator for indicating one of a plurality of sets, wherein each set comprises a plurality of subframe values. The repetition index is for selecting one of the subframe values from the indicated set, wherein the selected subframe value indicates a number of subframes used to carry the downlink transmission. Aspects of the disclosure may provide a corresponding transmission by the communication device e.g. as a base station, and a communication device according to any example.

In some examples, receiving the set indicator may be considered as obtaining the set indicator. In some aspects, the disclosure may be defined without reference to receiving or obtaining the set indicator. The set indicator may be used by a communication device without reference to the receiving or obtaining of the set indicator.

What is claimed is:

1. A method, performed by a communication device, for decoding a downlink transmission, the method comprising:
   receiving a repetition index, a set indicator, and the downlink transmission, wherein the downlink transmission spans a plurality of subframes;
   using the repetition index as an index into one of a plurality of sets of subframe values specified by the set indicator to determine the number of subframes spanned by the downlink transmission;
   receiving the downlink transmission according to the determined number of subframes.

2. The method of claim 1, wherein receiving the downlink transmission comprises receiving the downlink transmission on a Physical Downlink Shared Channel (PDSCH) and/or as a transport block.

3. The method of claim 1, wherein the subframe value indicated by the repetition index and set index indicates a number of subframes used to carry the downlink transmission via repetitions or bundling.

4. The method of claim 1, wherein receiving the repetition index and set indicator comprises receiving the repetition index and set indicator separately.

5. The method of claim 1, wherein receiving the set indicator comprises receiving signaling of the set indicator on a less frequent basis than the receiving of the repetition index.

6. The method of claim 1, wherein the receiving the set indicator comprises receiving the set indicator via Radio Resource Control (RRC) signaling.

7. The method of claim 1, further comprising receiving control information comprising respective fields indicating the repetition index and a modulation and coding scheme relating to the downlink transmission.

8. The method of claim 7, wherein the control information is downlink control information (DCI).

9. The method of claim 1, wherein the communication device transmits and/or receives at a Radio Frequency (RF) bandwidth that is narrower than a system bandwidth available to the communication device.

10. The method of claim 1, wherein the communication device is classified as a low-cost (LC) or coverage enhanced (CE) communication device.

11. A communication device, comprising:
    communication circuitry configured to send and receive wireless communications;
    processing circuitry communicatively coupled to the communication circuitry configured to:
      receive, via the communication circuitry, a repetition index, a set indicator, and the downlink transmission, wherein the downlink transmission spans a plurality of subframes;
      use the repetition index as an index into one of a plurality of sets of subframe values specified by the set indicator to determine the number of subframes spanned by the downlink transmission;
      receive the downlink transmission according to the determined number of subframes.

12. The communication device of claim 11, wherein the communication circuitry is configured to receive the downlink transmission on a Physical Downlink Shared Channel (PDSCH) and/or as a transport block.

13. The communication device of claim 11, wherein the subframe value indicated by the repetition index and set index indicates a number of subframes used to carry the downlink transmission via repetitions or bundling.

14. The communication device of claim 11, wherein the communication circuitry is further configured to receive the repetition index and set indicator separately.

15. The communication device of claim 11, wherein the communication circuitry is configured to receive signaling of the set indicator on a less frequent basis than the repetition index.

16. The communication device of claim 11, wherein the communication circuitry is configured to receive the set indicator via Radio Resource Control (RRC) signaling.

17. The communication device of claim 11, wherein the communication circuitry is configured to receive control information comprising respective fields indicating the repetition index and a modulation and coding scheme relating to the downlink transmission.

18. The communication device of claim 11, wherein the communication circuitry is configured to transmit and/or receive at a Radio Frequency (RF) bandwidth that is narrower than a system bandwidth available to the communication device.

19. The communication device of claim 11, wherein the communication device is classified as a low-cost (LC) or coverage enhanced (CE) communication device.

20. A non-transitory computer readable medium storing a computer program product for decoding a downlink transmission, the computer program product comprising software instructions which, when executed by processing circuitry of a communication device, causes the communication device to:
- receive a repetition index, a set indicator, and the downlink transmission, wherein the downlink transmission spans a plurality of subframes;
- use the repetition index as an index into one of a plurality of sets of subframe values specified by the set indicator to determine the number of subframes spanned by the downlink transmission;
- receive the downlink transmission according to the determined number of subframes.

* * * * *

UNITED STATES PATENT AND TRADEMARK OFFICE
CERTIFICATE OF CORRECTION

PATENT NO. : 10,666,411 B2  
APPLICATION NO. : 16/059296  
DATED : May 26, 2020  
INVENTOR(S) : Yufei Blankenship It is certified that error appears in the above-identified patent and that said Letters Patent is hereby corrected as shown below:

In the Specification

In Column 1, Line 5, delete "2016," and insert -- 2016, now Pat. No. 10,079,662, --, therefor.

In Column 4, Line 15, delete "NPRB≤6" and insert -- $N_{PRB} \leq 6$ --, therefor.

In Column 4, Line 23, delete "NPRB=1" and insert -- $N_{PRB}=1$ --, therefor.

In Column 4, Line 25, delete "NPRB=2" and insert -- $N_{PRB}=2$ --, therefor.

In Column 4, Line 27, delete "NPRB=3" and insert -- $N_{PRB}=3$ --, therefor.

In Column 4, Line 29, delete "NPRB=4" and insert -- $N_{PRB}=4$ --, therefor.

In Column 4, Line 31, delete "NPRB=5" and insert -- $N_{PRB}=5$ --, therefor.

In Column 4, Line 33, delete "NPRB=6" and insert -- $N_{PRB}=6$ --, therefor.

In Column 6, Line 19, delete "-300" and insert -- ~300 --, therefor.

In Column 7, Line 47, delete "number vacant" and insert -- number of vacant --, therefor.

In Column 7, Line 47, delete "NPRB," and insert -- $N_{PRB}$, --, therefor.

In Column 7, Line 48, delete "NPRB" and insert -- $N_{PRB}$ --, therefor.

In Column 8, Line 21, delete "NPRB=1." and insert -- $N_{PRB}=1$. --, therefor.

In Column 8, Line 35, delete "NPRB=2." and insert -- $N_{PRB}=2$. --, therefor.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,666,411 B2

In Column 8, Line 36, delete "NPRB=3." and insert -- $N_{PRB}$=3. --, therefor.

In Column 8, Line 37, delete "NPRB=4." and insert -- $N_{PRB}$=4. --, therefor.

In Column 8, Line 37, delete "NPRB=5." and insert -- $N_{PRB}$=5. --, therefor.

In Column 8, Line 38, delete "NPRB=6." and insert -- $N_{PRB}$=6. --, therefor.

In Column 8, Line 47, delete "{$I_{TBs}$=2," and insert -- {$I_{TBS}$=2, --, therefor.

In Column 10, Line 44, delete "share channel" and insert -- shared channel --, therefor.

In Column 11, Line 13, delete ""subframe index')" and insert -- "subframe index" --, therefor.